United States Patent
Ogushi

(10) Patent No.: US 7,725,946 B2
(45) Date of Patent: May 25, 2010

(54) PROGRAM, SYSTEM AND METHOD FOR AUTHENTICATING PERMISSION TO USE A COMPUTER SYSTEM AND INHIBITING ACCESS TO AN UNAUTHORIZED USER

(75) Inventor: Nobuo Ogushi, Myouzai (JP)

(73) Assignee: Fujitsu Limited, Kawasaki (JP)

( * ) Notice: Subject to any disclaimer, the term of this patent is extended or adjusted under 35 U.S.C. 154(b) by 1041 days.

(21) Appl. No.: 11/406,284

(22) Filed: Apr. 19, 2006

(65) Prior Publication Data
US 2007/0044140 A1 Feb. 22, 2007

(30) Foreign Application Priority Data
Aug. 18, 2005 (JP) ............... 2005-237085

(51) Int. Cl.
G06F 7/04 (2006.01)
H04L 9/32 (2006.01)
G06F 17/30 (2006.01)

(52) U.S. Cl. ............... 726/28; 726/2; 726/22; 726/23

(58) Field of Classification Search ............ 726/2, 726/22, 23, 28
See application file for complete search history.

(56) References Cited

U.S. PATENT DOCUMENTS 6,370,648 B1 * 4/2002 Diep ................ 726/22
6,550,010 B1 * 4/2003 Link et al. ............ 713/168
2002/0099956 A1 * 7/2002 Suzuki ................ 713/200
2002/0171546 A1 * 11/2002 Evans et al. ............ 340/540

FOREIGN PATENT DOCUMENTS

JP 09-233542 9/1997
WO 01/39099 5/2001

OTHER PUBLICATIONS

DuMouchel, William. "Computer Intrusion Detection Based on Bayes Factors for Comparing Command Transition Probabilities", 1999.*

* cited by examiner

Primary Examiner—Michael J Simitoski

(57) ABSTRACT

An authenticating program, system and method for authenticating permission of a user to use a computer system, by storing inhibiting information, supervising input manipulation to a protected computer upon transition of the operating condition of the protected computer to the usable condition, acquiring input information to indicate contents of relevant input manipulations, and comparing the acquired input information with the inhibiting information stored in said inhibiting information storing means. Then, permission of the user is authenticated based on the result of the comparison. When the permission of the user is determined to be unauthentic, the operating condition of the computer is transitioned to a restricted condition.

3 Claims, 6 Drawing Sheets

| NO. | MANIPULATION OBJECT 211 | MANIPULATION CLASS 212 | MANIPULATION CHARACTERISTIC 213 | LOCK LEVEL 214 | UPDATING TIME 215 |
|---|---|---|---|---|---|
| 1 | ENTIRE PART OF FILES | OPEN | ACTIVATION FROM [RIGHT MENU OF MOUSE] | USABLE | 2005/06/03/17:00 |
| 2 | PROGRAM A | ACTIVATION | ACTIVATION FROM [START MENU] | USABLE WITHIN 50% | 2005/06/03/12:00 |
| 3 | PROGRAM A | ACTIVATION | ACTIVATION FROM [RIGHT MENU OF MOUSE] | USABLE | 2005/06/03/15:03 |
| 4 | PROGRAM A | COPY | ACTIVATION FROM [RIGHT MENU OF MOUSE] | USABLE | 2005/06/05/15:05 |
| 5 | PROGRAM A | COPY | ACTIVATION BY [CTR+C] MANIPULATION | USABLE WITHIN 50% | 2005/06/05/15:07 |
| 6 | PROGRAM A | MENU MANIPULATION | ACTIVATION BY MANIPULATION [WITHOUT ALT KEY] | USABLE WITHIN 50% | 2005/04/05/10:00 |

FIG. 2

| NO. | MANIPULATION OBJECT 201 | MANIPULATION CLASS 202 | MANIPULATION CHARACTERISTIC 203 |
|---|---|---|---|
| 1 | ENTIRE PART OF FILES | OPEN | ACTIVATION FROM [RIGHT MENU OF MOUSE] |
| 2 | ENTIRE PART OF FILES | OPEN | ACTIVATION BY MANIPULATION [WITH ALT KEY] |
| 3 | DOCUMENT FILES | COPY | ACTIVATION FROM [RIGHT MENU OF MOUSE] |
| 4 | DOCUMENT FILES | COPY | ACTIVATION BY [CTR+C] MANIPULATION |
| 5 | EXECUTING FILES | ACTIVATION | ACTIVATION FROM [START MENU] |
| 6 | EXECUTING FILES | ACTIVATION | ACTIVATION FROM [RIGHT MENU OF MOUSE] |
| 7 | EXECUTING FILES | COPY | ACTIVATION FROM [RIGHT MENU OF MOUSE] |
| 8 | EXECUTING FILES | COPY | ACTIVATION BY [CTR+C] MANIPULATION |
| 9 | EXECUTING FILES | MENU MANIPULATION | ACTIVATION BY MANIPULATION [WITH ALT KEY] |

FIG. 3

| NO. | MANIPULATION OBJECT 211 | MANIPULATION CLASS 212 | MANIPULATION CHARACTERISTIC 213 | LOCK LEVEL 214 | UPDATING TIME 215 |
|---|---|---|---|---|---|
| 1 | ENTIRE PART OF FILES | OPEN | ACTIVATION FROM [RIGHT MENU OF MOUSE] | USABLE | 2005/06/03/17:00 |
| 2 | PROGRAM A | ACTIVATION | ACTIVATION FROM [START MENU] | USABLE WITHIN 50% | 2005/06/03/12:00 |
| 3 | PROGRAM A | ACTIVATION | ACTIVATION FROM [RIGHT MENU OF MOUSE] | USABLE | 2005/06/03/15:03 |
| 4 | PROGRAM A | COPY | ACTIVATION FROM [RIGHT MENU OF MOUSE] | USABLE | 2005/06/05/15:05 |
| 5 | PROGRAM A | COPY | ACTIVATION BY [CTR+C] MANIPULATION | USABLE WITHIN 50% | 2005/06/05/15:07 |
| 6 | PROGRAM A | MENU MANIPULATION | ACTIVATION BY MANIPULATION [WITHOUT ALT KEY] | USABLE WITHIN 50% | 2005/04/05/10:00 |

FIG. 4

| NO. | MANIPULATION OBJECT 301 | MANIPULATION CLASS 302 | MANIPULATION CHARACTERISTIC 303 | MANIPULATING TIME 304 |
|---|---|---|---|---|
| 1 | PROGRAM A | ACTIVATION | ACTIVATION FROM [RIGHT MENU OF MOUSE] | 2005/06/05/15:03 |
| 2 | PROGRAM A | COPY | ACTIVATION FROM [RIGHT MENU OF MOUSE] | 2005/06/05/15:05 |
| 3 | PROGRAM A | COPY | ACTIVATION FROM [CTR + C] | 2005/06/05/15:07 |
| 4 | PROGRAM B | ACTIVATION | ACTIVATION FROM [RIGHT MENU OF MOUSE] | 2005/06/05/15:10 |

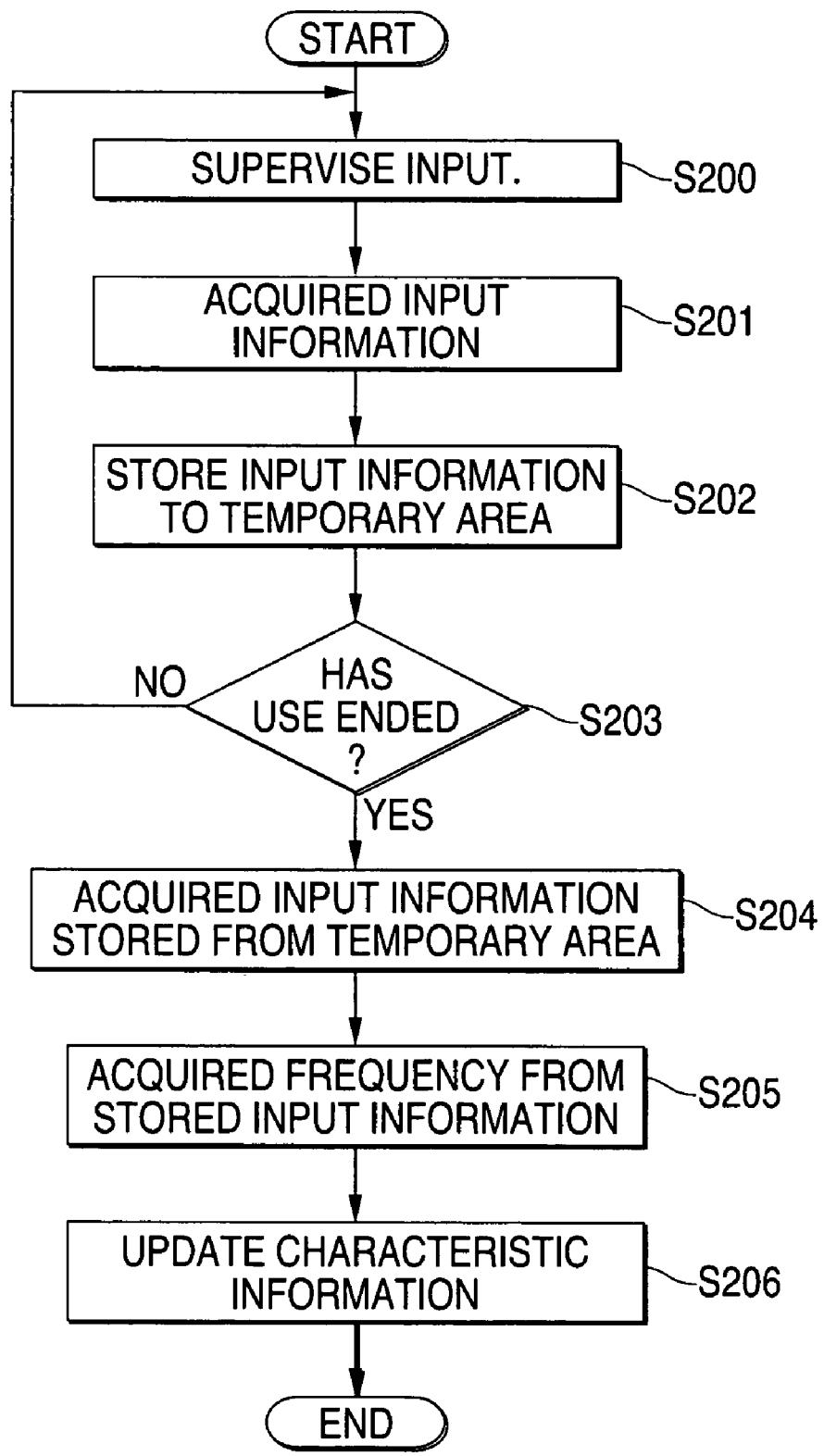

Ｕ S 7,725,946 B2

PROGRAM, SYSTEM AND METHOD FOR AUTHENTICATING PERMISSION TO USE A COMPUTER SYSTEM AND INHIBITING ACCESS TO AN UNAUTHORIZED USER

CROSS-REFERENCE TO RELATED APPLICATIONS

This application is related to and claims the benefit of priority to Japanese Patent Application No. 2005-237085, filed Aug. 18, 2005, in Japan, the contents of which are incorporated by reference herein.

BACKGROUND OF THE INVENTION

1. Field of the Invention

The present invention relates to a technology for disabling access by a person not authorized to use a system, by identifying the person.

When using a personal computer or the like, permission of use is authenticated using an ID and a password or the like, for exclusion of use by persons other than the authorized users. Moreover, in view of eliminating inconvenience, if a user leaves his/her seat after the authentication has been made, the condition of the personal computer or the like is automatically shifted to the condition before the authentication is conducted, when data has not been inputted within a predetermined period.

As the chance for authenticating permission of use increases, there arises the problem that whereas security of the apparatus and the information processed by the apparatus can be improved, convenience of users deteriorates.

2. Description of the Related Art

Official Gazette No. W001/039099 describes a technology for authentication based on a pattern of input manipulations using a mouse or the like when use is started or re-use is conducted as the technology for alleviating a manipulation load imposed on a user at the time of performing authentication for permission of use.

Moreover, as to other technology for eliminating inconvenience when a user leaves a user's own seat after authentication, JP-A No. 09-233542 discloses setting the apparatus usable only when the code matched with the ID code registered previously can be obtained by periodically communicating with the non-contact system with an IC card or the like carried by a user.

The related art explained above has been proposed as the technology for providing convenience to a user while security is improved. However, in the related art, security is not provided at all immediately after a user leaves his/her seat after the authentication, or in a case of a theft of the apparatus after the authentication. Moreover, such a disadvantage also appears when the ID and password which are inputted for the authentication have been stolen or when the IC card or the like carried by a user is stolen, in the technology described in JP-A No. 09-233542.

SUMMARY OF THE INVENTION

Accordingly, it is an object of the present invention to provide an authenticating program and an authenticating system which can exclude use by persons other than the authorized users, even if the authenticating information is stolen or the apparatus itself is stolen after the authentication.

The authenticating program of the present invention is characterized by controlling a protecting computer to function as: inhibiting information storing means for storing an inhibiting information to indicate inhibited manipulation contents; input supervising means for supervising input manipulations for a protected computer when operating condition of a relevant, protected computer shows a transition to a usable condition; input information acquiring means for acquiring input information to indicate contents of the relevant input manipulations when the input supervising means detects input manipulations; comparing means for comparing the acquired input information with the inhibiting information stored in the inhibiting information storing means; authenticating means for authenticating a relevant user on the basis of a result of the comparing means; and use control means for transition of the operating condition of the protected personal computer to a condition in which use is restricted, when the relevant user is determined to be not permitted to use the protected computer, by the authenticating means.

The authenticating program described above is characterized in that the authenticating means controls the computer to function as means for determining that permission of the relevant user to use the protected computer is not authenticated when it is proved that the inhibiting information corresponding to manipulation contents indicated by the input information exists as a result of comparison with the comparing means.

Moreover, the authenticating program described above is characterized by controlling the computer function as characteristic information storing means for storing characteristic information showing manipulation contents and formatted with inclusion of a manipulation permitting frequency; input information temporary storing means for storing input information acquired from the input information acquiring means; second input information acquiring means for acquiring input information stored in the input information temporary storing means; frequency acquiring means for sorting the input information acquired with the second input information acquiring means in accordance with manipulation contents thereof and acquiring a frequency of appearance of each sorted input information; comparing means for acquiring characteristic information corresponding to manipulation contents indicated in the sorted input information from the characteristic information storing means and comparing the frequency indicated by the relevant characteristic information acquired with the acquired frequency of appearance; authenticating means for determining, on the basis of a result of the comparing means, whether the frequency of appearance of manipulation contents indicated by the acquired input information is included in the range of the permitted frequencies; and use control means for setting the operating condition of the protected personal computer to the condition where use is restricted when the authenticating means decides the frequency of appearance of the manipulation content of the acquired input information is not included in the range of the permitted frequencies and also setting the operating condition of the protected personal computer to the condition where use is possible when the authenticating means decides the frequency of appearance of manipulation contents of the acquired input information is included in the range of the permitted frequencies.

Moreover, the authenticating program described above is characterized by controlling the computer function as: authenticating means for determining whether characteristic information exists, corresponding to manipulation contents indicated by the relevant input information each time the input information is acquired with the input information acquiring means, and acquiring, when existence of the relevant characteristic information can be detected, the frequency of appearance of manipulation contents indicated by the relevant input information with the frequency acquiring means in order to perform authentication on the basis of the acquired frequency.

Moreover, the authenticating program described above is characterized by controlling the computer function as: second authenticating means for authenticating a user based on the input authenticating information by accepting, with the use control means, input of the authenticating information for identifying the relevant user after transition of the operating condition of the relevant, protected personal computer to the condition where use is restricted; use control means for transition of the operating condition of the relevant personal computer to a usable condition when authentication of the relevant user is decided to be permitted with the second authenticating means; and updating means for updating the information about manipulation contents with which the relevant use is restricted when the second authenticating means decides authentication of the relevant user to be permitted.

Moreover, the authenticating program described above is characterized by controlling the computer to function as: registration/non-registration selecting means for displaying the manipulation contents with which relevant manipulation contents are restricted before update, with the updating means, of the information about the manipulation contents with which use is restricted and accepting selection of registration/non-registration of the relevant manipulation contents as the permitted manipulation contents; and the updating means for updating the information about the manipulation contents with which use is restricted when instruction for selecting registration as the permitted manipulation contents is accepted with the registration/non-registration selecting means.

Moreover, an authenticating program of the present invention is characterized by controlling a computer to function as inhibiting information storing means for storing an inhibiting information to indicate inhibited manipulation contents; characteristic information storing means for storing characteristic information to indicate permitted manipulation contents; input supervising means for supervising input manipulations for the relevant computer when operating condition of the relevant computer shows transition to the usable condition; input information acquiring means for acquiring the input information to indicate contents of the relevant input manipulations when the input supervising means detects input manipulations; comparing means for comparing the acquired input information with the inhibiting information stored to the inhibiting information storing means; and registering means for registering the characteristic information for permitting the manipulation contents for the relevant user to the characteristic information storing means when it is proved that the inhibiting information corresponding to manipulation contents indicated in the input information exists as a result of comparison with said comparing means.

The authenticating program described above is characterized by controlling the computer to function as the characteristic information storing means for storing characteristic information which is formatted with inclusion of frequency for permitting manipulations to the characteristic information to indicate permitted manipulation contents; input information temporary storing means for storing input information acquired with the input information acquiring means; second input information acquiring means for acquiring input information stored in the input information temporary storing means in the predetermined timing; frequency acquiring means for acquiring a frequency of appearance for each sorted input information by sorting input information acquired with the second input information acquiring means in accordance with manipulation contents thereof; and updating means for updating the characteristic information on the basis of frequency acquired with the frequency acquiring means.

Moreover, the authenticating system of the present invention is characterized by comprising inhibiting information storing means for storing inhibiting information to indicate inhibited manipulation contents; input supervising means for supervising input manipulations for the relevant computer when operating condition of the relevant computer shows transition to the usable condition; input information acquiring means for acquiring input information to indicate contents of the relevant input manipulations when the input supervising means detects input manipulation; comparing means for comparing the acquired input information with inhibiting information stored in the inhibiting information storing means; authenticating means for authenticating the relevant user on the basis of a result of the comparing means; and use control means for transition of operating condition of the relevant personal computer to the condition where use is restricted when the authenticating means decides that authentication of the relevant user to be not permitted.

Moreover, the authenticating system of the present invention is characterized in comprising inhibiting information storing means for storing inhibiting information to indicate inhibited manipulation contents; characteristic information storing means for storing characteristic information to indicate permitted manipulation contents; input supervising means for supervising input manipulations for the relevant computer when operating condition of the relevant computer shows transition to the applicable condition; input information acquiring means for acquiring input information to indicate the relevant input manipulations when the input supervising means detects input manipulations; comparing means for comparing the acquired input information with inhibiting information stored in the inhibiting information storing means; and registering means for registering characteristic information for permitting the manipulation contents for the relevant user to the characteristic information storing means when it is proved that inhibiting information corresponding to manipulation contents indicated in the input information exists as a result of comparison with the comparing means.

With the present invention, use by persons other than the authorized users can be excluded, even if the apparatus is stolen after the conventional authentication using the user ID and password is performed. Particularly, illegal use can be immediately prohibited with the present invention by detecting manipulations not implemented by the authorized users. Moreover, with the present invention, the authentication can be controlled in accordance with the frequency of use of the authorized users. In addition, with the present invention, automatic setting of the characteristic information can be realized.

BRIEF DESCRIPTION OF THE DRAWINGS

FIG. 2 is a diagram illustrating examples of contents of an inhibiting information storing unit according to embodiments of the present invention.

FIG. 3 is a diagram illustrating examples of contents of a characteristic information storing unit according to embodiments of the present invention.

FIG. 4 is a diagram illustrating examples of contents of an input information temporary storing unit according to embodiments of the present invention.

FIG. 6 is a flow chart diagram illustrating an authenticating process according to an embodiment of the present invention.

DETAILED DESCRIPTION OF THE PREFERRED EMBODIMENTS

A best mode for embodying the present invention will be explained below with reference to the accompanying drawings.

Figure 1:
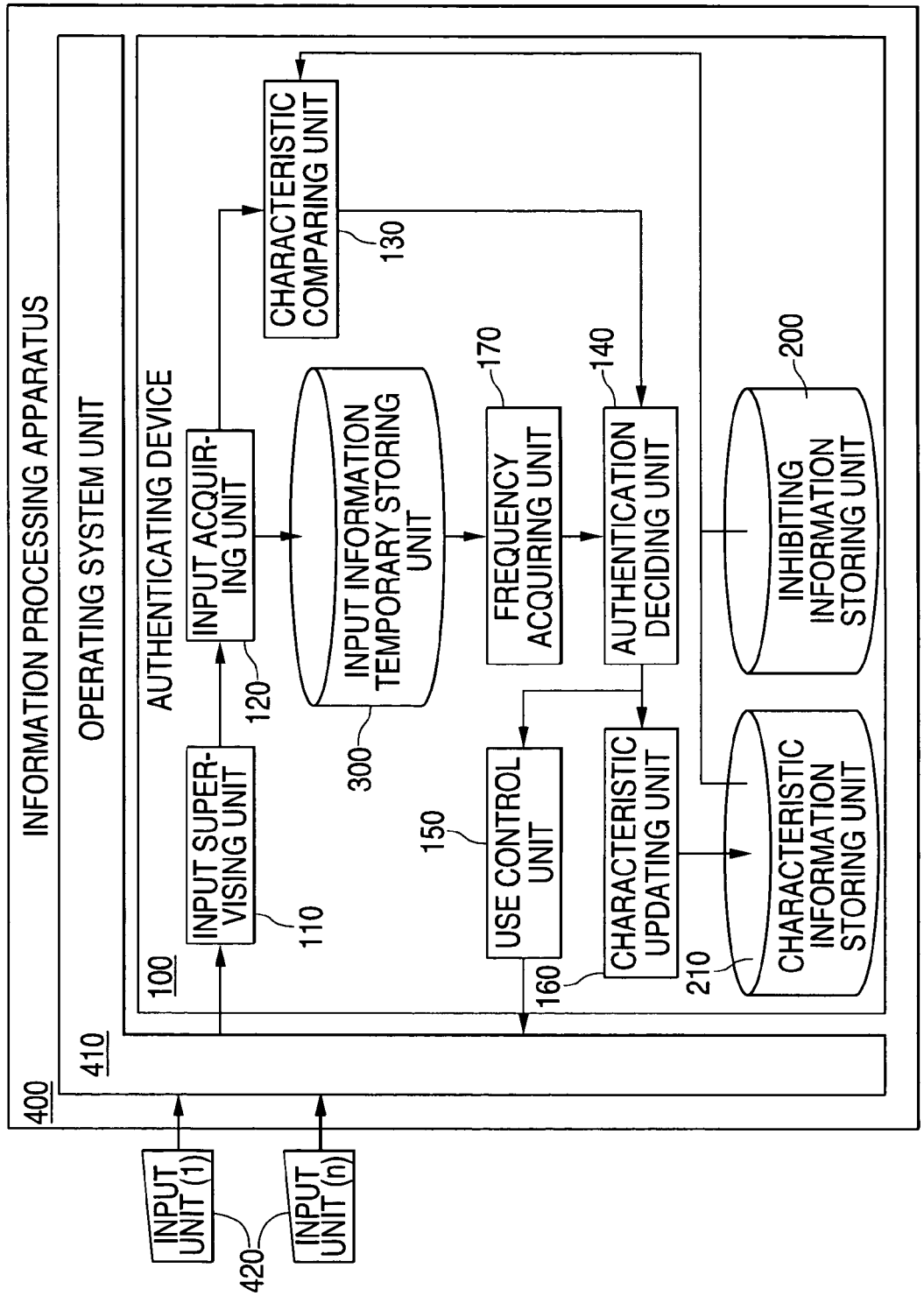
FIG. 1 is a diagram illustrating a system structure according to an embodiment of the present invention.

FIG. 1 is a diagram illustrating a structure of an information processing apparatus provided with an authenticating device according to an embodiment of the present invention. The information processing apparatus 400 of the present invention illustrated in FIG. 1 is constituted with an operating system unit 410 realizing the information processing functions of an information processing apparatus, an input unit 240 instructing input to the operating system unit, and the authenticating device 100 of the present invention. Here, the input unit 420 may also be constituted with a plurality of input units, such as a keyboard, a mouse or the like. Moreover, the authenticating device 100 is constituted with inclusion of an input supervising unit 110 supervising input manipulations for the information processing apparatus, an input acquiring unit 120 acquiring the input information indicating contents of the input manipulations, a characteristic comparing unit 130 comparing the acquired input information with inhibiting information stored in an inhibiting information storing means 200 described later, or with characteristic information stored in a characteristic information storing unit 210, described later, an authentication judging unit 140 judging whether manipulation contents indicated in the acquired input information are inhibited manipulation contents, a use control unit 150 controlling usable range in operations of the relevant personal computer in accordance with the result of the authentication judging unit, a characteristic updating unit 160 updating the characteristic information storing unit, described later, with the acquired input information, a frequency acquiring unit 170 acquiring a frequency from the input information stored in an input information temporary storing unit, described later, an inhibit information storing unit 200 storing inhibiting information for identifying inhibited manipulations among the input manipulations to the information processing apparatus, the characteristic information storing unit 210 storing a characteristic information identifying the input manipulations to the information processing apparatus which is formatted with inclusion of the frequency for permitting the relevant input manipulations, and an input information temporary storing unit 300 storing the acquired input information.

In the structure illustrated in FIG. 1, only a part of a device directly related to the authenticating process of the present invention is shown. The authenticating device of the present invention operates as a function of the information processing apparatus. Namely, the authenticating device of the present invention can be constituted to operate as processes executed by an arithmetic operation unit of the information processing apparatus or to provide the function in cooperation with the structure of the information processing apparatus. This embodiment of the present invention can provide a total effect, by supervising input manipulations to the information processing apparatus with the input supervising unit 110 and then starting conjugated operations of each structure when the relevant input manipulations are detected.

Next, authenticating processes in the authenticating device, according to an embodiment of the present invention, will be explained with reference to FIG. 5. First, the information processing apparatus 400 provided with the authenticating device 100 is driven to start the authenticating processes of the authenticating device 100. Moreover, it is also possible that the authenticating processes of the authenticating device 100 of the present invention are started when restriction for use of the information processing apparatus is cancelled.

The authenticating device 100 of the present invention supervises input manipulations for the information processing apparatus (S100 in FIG. 5) when the authenticating processes are started. Upon detection of the input manipulations for the information processing apparatus, input information about the relevant input manipulations is acquired (S101 in FIG. 5) and the acquired input information is stored to the input information temporary storing unit (S102 in FIG. 5). Here, the input information about the relevant input manipulations is formatted with inclusion of an object of input manipulation, contents of input manipulation, and time of input manipulation. An object of the input manipulation corresponds to an application program which is activated in the information processing apparatus and an operating system providing the basic functions of the information processing apparatus. Contents of input manipulation correspond, for example, to activation of the relevant application program and input manipulation for the relevant activated application program.

Contents of input manipulation should be the information which can be identified with the instructions based on different manipulation methods, even if these information pieces will generate the identical result. In practice, contents of input manipulation are formatted with inclusion of a manipulation characteristic corresponding to a manipulation class sorted in accordance with object of the input manipulation and practical instruction method of manipulation. The authenticating device 100 of the present invention can acquire the input information described above by detecting event information for the input manipulation provided by the operating system of the information processing apparatus provided thereto.

Figure 5:
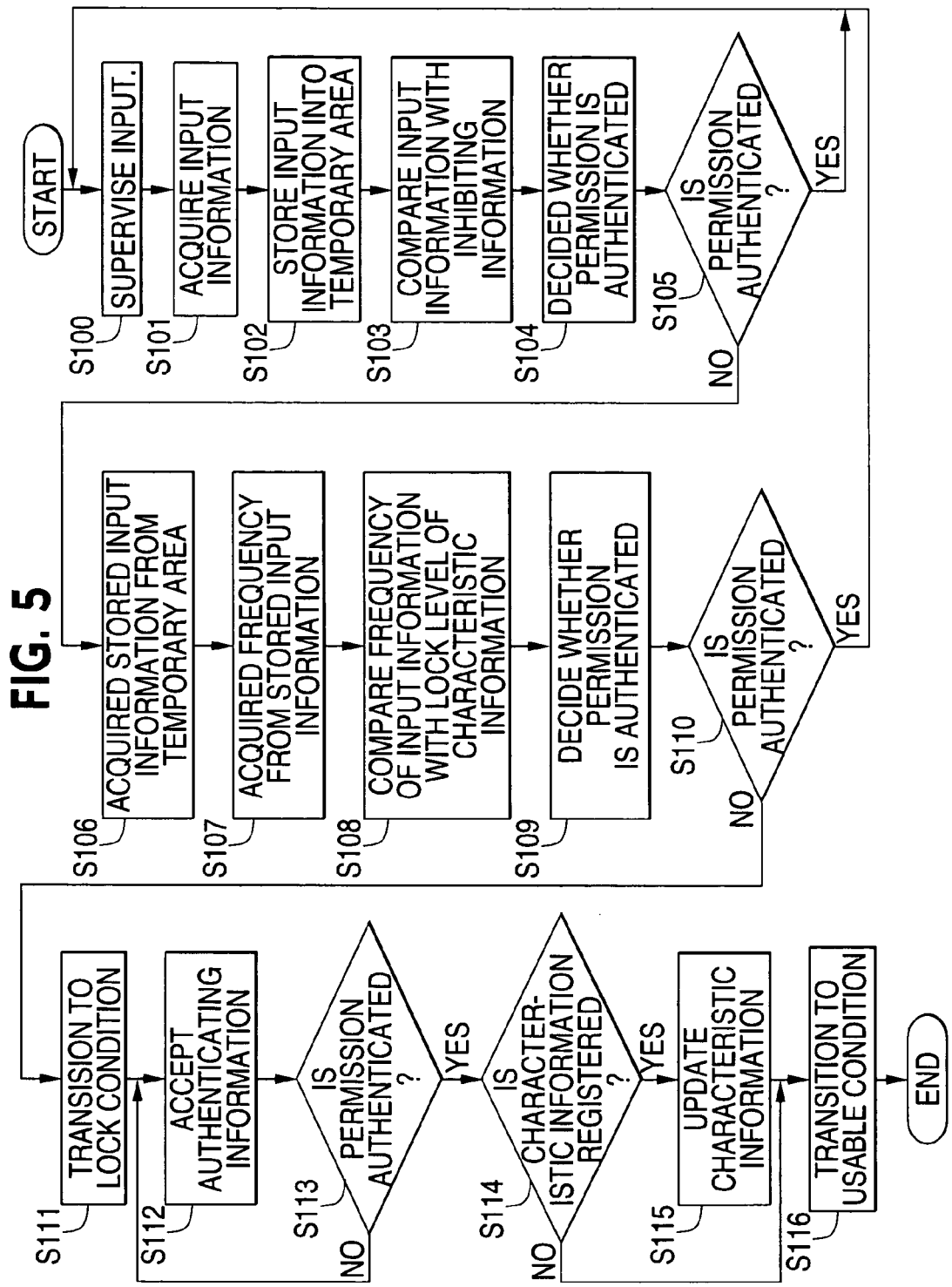
FIG. 5 is a flow chart diagram illustrating an authenticating process according to an embodiment of the present invention.

Next, the authenticating device 100 of the present invention compares the acquired input information described above with inhibiting information stored to the inhibiting information storing unit 200 (S103 in FIG. 5). Here, the inhibiting information stored in the inhibiting information storing unit 200 is formatted with inclusion of a manipulation object 201, a manipulation class 202, and a manipulation characteristic 203 (referring to FIG. 2). FIG. 2 shows an example where the inhibiting information "No.1" including the manipulation characteristic of "Activation from [right menu of mouse]" and the inhibiting information of "No.2" including the manipulation characteristic of "Activation by manipulation [with ALT key]" for the manipulation contents including the manipulation object of "Entire part of files" and manipulation class of "Open", the inhibiting information of "No. 3" including the manipulation characteristic of "Activation from [right menu of mouse]" and the inhibiting information of "No. 4" including the manipulation characteristic of "Activation by manipulation [CTR+C]" for the manipulation contents including the manipulation object of "Document file" and manipulation class of "Copy", the inhibiting information of "No. 5" including the manipulation characteristic of "Activation from [start menu]" and the inhibiting information of "No. 6" including the manipulation characteristic of "Activation from [right menu of mouse]" for the manipulation contents including the manipulation object of "Executing file" and manipulation class of "Activation", the inhibiting information of "No. 7" including the manipulation characteristic of "Activation from [Right menu of mouse]" and the inhibiting information of "No. 8" including the manipulation characteristic of "Activation by manipulation [CTR+C]" for the manipulation contents including the manipulation object of "Executing file" and manipulation class of "Copy", and the inhibiting information of "No. 9" including the manipulation characteristic of "Activation by manipulation [without ALT key]" for the manipulation contents including the manipulation object of "Executing file" and manipulation class of "Menu manipulation".

In the comparing process described above, comparison and decision of a manipulation object, manipulation class, and a manipulation characteristic of inhibiting information are performed for the manipulation object and manipulation contents shown by the input information, and it is determined whether the inhibiting information corresponding to the input information exists.

Next, the authenticating device 100 of the present invention decides authentication of the relevant users in accordance with a result of the comparing and judging process described above (S104 in FIG. 5). Namely, when the inhibiting information corresponding to the input information does not exist, the relevant authentication is decided to be permitted (YES of S105 in FIG. 5) and the input supervising process described above is continued (S100 in FIG. 5).

Meanwhile, when the inhibiting information corresponding to the input information exists, the relevant authentication is decided to be not permitted (NO of S105 in FIG. 5) and whether the relevant inhibiting manipulation is within the permitted range or not is determined (S106 to S110 in FIG. 5).

First, the manipulation object indicated in the input information acquired with the process S101 described above and the accumulated input information corresponding to the manipulation class are acquired from the input information temporary storing unit 300 (S106 in FIG. 5). The input information acquired from the input information temporary storing unit is sorted on the basis of the manipulation object, manipulation class, and manipulation characteristic, as well as the frequency of each sorted input information is acquired (S107 in FIG. 5).

Next, an example where the input information acquired in the process S101 described above includes the manipulation object of "Program A" and the manipulation class of "Copy" in the example of contents of the input information temporary storing unit in FIG. 4 will be explained. The input information acquired from the input information temporary storing unit becomes three input information pieces in total, including two information pieces of the input information pieces of "No. 2" and "No. 3", the manipulation object of "Program A" and the manipulation class of "Copy", and input information acquired in the process S101 described above not illustrated in FIG. 4. In this case, when the manipulation characteristic of the input information acquired in the process S101 is "Activation from [right menu of mouse]", the input information sorted with the relevant manipulation object, manipulation class, and manipulation characteristic becomes two information pieces in total and the frequency of the relevant input information becomes "67% (2 information pieces/3 information pieces)". Moreover, when the manipulation characteristic of the input information acquired in the process S101 is "Activation by manipulation of [CTR+C]", the frequency also becomes "67%". In the above description, the input information acquired in the process S101 is stored, in the process S102, in the input information temporary storing unit.

Next, the frequency of input information acquired in the process described above is compared with lock level of the characteristic information corresponding to the relevant input information of the characteristic information storing unit (S108 in FIG. 5) to decide whether authentication is permitted, in accordance with a result of comparison (S109 in FIG. 5). Here, following the practical example described above, when the input information includes the manipulation object of "Program A", manipulation class of "Copy", and manipulation characteristic of "Activation from [right menu of mouse]" in the example of contents of the characteristic information storing unit in FIG. 3, since the lock level 214 of the characteristic information of "No. 4" corresponding to the relevant input information is "usable", the relevant authentication is decided to be permitted without relation to the frequency of the input information (YES of S110 in FIG. 5) and the input supervising process described above is continued (S100 in FIG. 5). In the example of FIG. 4, the characteristic information of the characteristic information storing unit is formatted with inclusion of the manipulation object 211, manipulation class 212, manipulation characteristic 213, lock level 214, and updating time 215. Here, the updating time 215 becomes the value which has been attained in S101 by updating the updating time of the relevant characteristic information with the time where the input information has been acquired in the case where the characteristic information corresponding to the input information acquired in S101 exists in the comparing process of S108. That is, the updating time 215 of the characteristic information indicates the latest time when the manipulation contents indicated in the characteristic information are detected. Accordingly, the lower the use frequency of the manipulation contents of the characteristic information is, the older the updating time becomes.

On the other hand, in the example of contents of the characteristic information storing unit in FIG. 3, when the input information includes the manipulation object of "Program A", manipulation class of "Copy", and manipulation characteristic of "Activation from [CTR+C]", the lock level 214 of the characteristic information of "No. 5" corresponding to the relevant input information becomes "usable within 50%". Following the practical example described above, since the frequency of the relevant input information is "67%", the frequency of "67%" of the relevant input information exceeds the frequency of "50%" in the permitted range indicated by the lock level of the relevant characteristic information. Accordingly, the relevant authentication is decided to be not permitted (NO of S110 in FIG. 5) for setting the operating condition of the personal computer to the lock condition where use is restricted (S111 in FIG. 5). In the example of contents of the input information temporary storing unit illustrated in FIG. 4, since the corresponding inhibiting information of the manipulation contents indicated by the input information pieces of "No. 1", "No. 2", and "No. 3" is registered to the inhibiting information storing unit (refer to FIG. 2, for example, the inhibiting information "No. 6" corresponds to the input information "No. 1"), the authentication is decided to be "not permitted" in the decision for authentication in the process S104. However, since the frequency of appearance of the relevant input information is included in the allowable range indicated by the lock level of the corresponding characteristic information registered to the characteristic information storing unit (referring to FIG. 3), the authentication is decided to be permitted in the decision for authentication in the process S109 and the operating condition of the personal computer is freed from the lock condition. However, when the manipulation sequence of the input information pieces of "No. 2" and "No. 3" of the input information temporary storing unit in FIG. 4 is inverted, namely when the manipulating time 304 of the input information "No. 3" is earlier than that of the input information "No. 2", since the frequency of appearance of the relevant input information exceeds the allowable range indicated by the lock level of the corresponding characteristic information registered to the characteristic information storing unit in FIG. 3 (since the frequency of appearance of the relevant input information becomes "100%" in the routine for acquiring the input information "No. 3" in the process S101), the authentication is decided to be not permitted in the decision for authentication of the process S109.

Moreover, since the corresponding inhibiting information "No. 5" of the manipulation contents indicated by the input information "No. 4" of the input information temporary storing unit in FIG. 4 is registered to the inhibiting information storing unit (referring to FIG. 2), the authentication is decided to be "not permitted" in the decision of authentication in the process S104. In this case, since the characteristic information corresponding to the relevant input information is not registered to the characteristic information storing unit (refer to FIG. 3), the authentication is decided to be "not permitted" in the decision of authentication. The manipulation objects of "Program A" and "Program B" in the input information of the input information temporary storing unit in FIG. 4 are assumed to be corresponding to the manipulation objects of "Entire Part of Files" and "Executing files", illustrated in FIG. 2 and FIG. 3.

Next, the authenticating device 100 of the present invention accepts the authentication information of a user under the lock condition where use of the personal computer is restricted (S112 in FIG. 5). Here, the user authenticating information is the information that is formed by combination of the intrinsic identifier of each user and password which is freely set by a user or is formed as biological information such as a vein of a palm or the like which is capable of uniquely identifying the users. When the permission is determined to be not authenticated using the authenticating information accepted in the process S112 (NO of S113 in FIG. 5), the accepting process of the authenticating information in the process S112 is continued.

Meanwhile, when the authentication using the authenticating information accepted in the process S112 is decided to be permitted (YES of S113 in FIG. 5), the manipulation contents indicated by the input information with which the relevant use is restricted are accepted to select whether these contents should be eliminated or not from the inhibited manipulations (S114 in FIG. 5). In this case, the manipulation contents indicated by the relevant input information with which the relevant use is restricted may be formed in the format for display on the display unit of the information processing apparatus 400. Moreover, in the above selection, not only the selection of "usable" is accepted but also an increase or decrease of frequencies within the allowable range can also be accepted. In the case where the selection for eliminating the manipulation contents indicated by the input information, with which the relevant use is restricted, are eliminated from the inhibited manipulation or for increasing or decreasing the frequencies within the allowable range is accepted in the process S114 described above (YES of S114 in FIG. 5), the characteristic information of the characteristic information storing unit is updated in accordance with the selection content (S115 in FIG. 5), and the operating condition of the information processing apparatus 400 is set to the usable condition (S116 in FIG. 5).

On the other hand, when the selection for no-elimination or no-increase and no-decrease of the frequency is accepted. (NO of S114 in FIG. 5), the characteristic information storing unit is not updated and the operating condition of the information processing apparatus 400 is set to the usable condition (S116 in FIG. 5). With the structure described above, formation of the more optimum characteristic information becomes possible.

When the operating condition of the information processing apparatus 400 is set to the usable condition, the authenticating device 100 of the present invention starts input supervising of the information processing apparatus 400 (S100 in FIG. 5).

In addition to the examples illustrated in FIG. 2 and FIG. 4, the characteristic information and manipulation class of the input information include activation/end of program, file manipulation (generation/copy/moving/deletion/sending/printing), folder manipulation (selection/moving/deletion/sending/search/common use), menu manipulation (for each program), manipulation of control panel, manipulation of printer, manipulation of network, and manipulation of task manager, or the like.

The characteristic information stored in the characteristic information storing unit 200 may be in a format based on each user's discrimination. In this case, the characteristic information to be referred can be identified on the basis of the user identification code or the like to be inputted when restriction on use of the information processing apparatus is cancelled.

In the embodiment described above, the authentication is performed on the basis of frequency of the input manipulation when the input supervising time has passed the predetermined time. Moreover, it is also possible to start the process when the number of input information pieces stored in the input information temporary storing unit has exceeded a predetermined value.

Accordingly, if ambiguous manipulation has been detected in the condition where the information processing apparatus is usable, the information processing apparatus can be locked immediately. Moreover, when a user unexpectedly leaves his/her own seat without any locking manipulation under the condition that the personal computer is activated, the apparatus can also be locked automatically. In addition, it is also possible that the characteristic information is automatically registered by learning the characteristic of a user from ordinary use.

Moreover, according to the present invention, since manipulation of a user is not identified only with manipulation object and manipulation class, but also with reference to the characteristic information indicating the manipulation instructing method, more accurate authentication can be realized whenever it is required. In addition when the predetermined manipulation is set as the inhibited manipulation for a certain object, use of the method for using such manipulation object is never cancelled. However, when the manipulation instructing method is different from the inhibited manipulation described above, since such method is permitted even if the instruction contents to the manipulation object is identical to the inhibited manipulation, convenience of the authorized user can be maintained. Moreover, in the above description, the manipulation to be inhibited is registered as the characteristic information for identifying a user. However, it is also possible that the permitted manipulation is registered in place of registering the inhibited manipulation. When it is considered that a variety of manipulation contents is provided for a terminal, the amount of information pieces to be registered to the authenticating device of the present invention can be reduced, when the inhibited manipulations are registered.

In addition, it is also possible to provide a structure where the determination of whether the predetermined time calculated from the present time has passed or not is based on the updating time 215 for the characteristic information registered to the characteristic information storing unit in the predetermined timing and the characteristic information, which has passed a predetermined time measured from the updating time, is invalidated.

With the structure described above, use by the persons other than the authorized users can be eliminated, even if the apparatus is stolen after the conventional authentication based on the user ID and password. Particularly, illegal use can be inhibited immediately by detecting manipulations which are never used by the authorized users.

In the above description of the embodiment of the present invention, the input supervising unit of the authenticating device is constituted as directly supervising the input manipulations to the information processing apparatus provided with the relevant authenticating device, but it is never limited thereto. For example, it is also possible to employ the structure to supervise the input manipulation to the relevant information processing apparatus from another terminal connected via a network with an information processing apparatus provided with the authenticating device of the present invention. In this case, constant security can be acquired in the multi-user environment by providing a structure that all users use in common the setting contents of the inhibiting information. Moreover, with such structure, convenience of each user can be maintained while the constant security is maintained under the multi-user environment by providing the structure to register individually the characteristic information for each user.

Moreover, the characteristic information storing unit and inhibiting information storing unit in the structure of the authenticating device of the present invention may be structured for common use among a plurality of authenticating devices. Particularly, since the function units described above can be used in common via the network, the setting contents of the characteristic information and inhibiting information can be used in common in the multi-user environment of the personal computer developed on the domain, the authenticating process reflecting the characteristic of the relevant user can be realized with use of any type of personal computer developed on the domain, and convenience of each user can be maintained while the constant security is maintained in the multi-user environment with a plurality of information processing apparatuses.

Next, according to another embodiment of the present invention, the processes in the learning mode in the authenticating device of the present invention will be described with reference to FIG. 6. First, the information processing apparatus 400 provided with the authenticating device 100 of the present invention is activated and the authenticating device 100 of the present invention accepts the instruction to start the learning mode and starts the processes of the learning mode. Start of the learning mode can be instructed with the structure for instructing manipulation of user of the information processing apparatus 400 or with the structure for automatically starting the learning mode when the authenticating device in the relevant information processing apparatus 400 is first activated.

First, the authenticating device 100 of the present invention supervises input manipulation to the information processing apparatus (S200 in FIG. 6) when the learning mode is started. When the input manipulation to the information processing apparatus is detected, the input information of the relevant input manipulation is acquired (S201 in FIG. 6) and the acquired input information is stored to the input information temporary storing unit (S202 in FIG. 6). Here, the input information about the relevant input manipulation is formatted with inclusion of an input manipulation object, input manipulation content and input manipulation time. Here, the input manipulation object corresponds, for example, to an application program activated in the information processing apparatus and an operating system providing the basic functions of the information processing apparatus. The input manipulation content corresponds, for example, to activation of the relevant application and input manipulation to the relevant activated application program.

The input manipulation content should be assumed as the information which is capable of identifying the manipulations instructed with different manipulating methods, even when these methods will generate an identical result. For example, the input manipulation content is formatted with inclusion of manipulation class sorted in accordance with the input manipulation object and manipulation characteristic corresponding to the practical instructing method of manipulation. The authenticating device 100 of the present invention can acquire the input information described above by detecting event information for the input manipulation provided by the operating system of the information processing apparatus.

Next, the authenticating device 100 of the present invention decides whether the end of the learning mode has been instructed or not (S203 in FIG. 6). When it is decided that it is not the end of learning mode in the above decision (NO of S203 in FIG. 6), the input supervising in the process S200 is continued.

On the other hand, when it is decided that the end of learning mode is instructed in the above decision (YES of S203 in FIG. 6), the input information stored in the input information temporary storing unit is acquired (S204 in FIG. 6), the acquired input information is sorted in accordance with the manipulation object and manipulation class, and the frequency of input information is acquired with a method similar to that in the previous embodiment (S205 in FIG. 6).

Next, the authenticating device 100 of the present invention updates the characteristic information of the characteristic information storing unit using the input information acquired and the frequency thereof (S206 in FIG. 6). Here, it is also possible to add a structure to a display of a list of the updating contents of the characteristic information to the display unit of the information processing apparatus before execution of the updating process in the process S206 and to accept the selection instruction of the contents to be updated from the displayed list.

Moreover, it is also possible to provide a structure to display not only the selection for update and non-update but also the contents of input manipulation and frequency of appearance thereof for the acceptance of the selection instruction for the contents to be updated and to accept the instruction for increasing or decreasing the allowable range of the frequency of appearance of the relevant input manipulation. For the update of the acquired input information and the characteristic information using the frequency thereof, the latest time among the manipulation object, manipulation class, manipulation characteristic, and manipulation time of the relevant input information corresponds to the manipulation object, manipulation class, manipulation characteristic, and updating time of the characteristic information and the frequency of the input information acquired in the process S205 corresponds to the lock level of the characteristic information. Namely, when the frequency of the input information acquired in the process S205 is "50%", the lock level of the characteristic information becomes "usable within 50%". Here, it is also possible to provide a structure to set the value obtained by rounding up or off the first digit of the frequency value of input information as the lock level of the characteristic information.

Although a few embodiments of the present invention have been shown and described, it would be appreciated by those skilled in the art that changes may be made in these embodiments without departing from the principles and spirit of the invention, the scope which is defined in the claims and their equivalents.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer readable recording medium storing an authenticating program controlling a computer to function as:
   input supervising means that supervises input manipulation of a computer while a user is logged in the computer;
   input information acquiring means that acquires input information related to an input manipulation detected by the input supervising means, the input information including a manipulation object identifying an object of the input manipulation, a manipulation class identifying a process executed for the manipulation object, and a manipulation characteristic identifying a manner in which the process is executed;
   characteristic information storing means that stores characteristic information including stored manipulation objects, stored manipulation classes identifying processes executed for the stored manipulation objects, stored manipulation characteristics identifying manners of executing the processes, and characteristic frequencies, each characteristic frequency corresponding to one of the stored manipulation objects, with a corresponding manipulation class, and a corresponding stored manipulation characteristic;
   frequency acquiring means that sorts the input information into groups of input manipulations having the same manipulation object and the same manipulation class, and acquires a frequency of appearance of a manipulation characteristic in a group based on the sorted input information corresponding to input manipulations of the group;
   frequency based comparing means that acquires a characteristic frequency corresponding to the same manipulation characteristic as the manipulation characteristic in the group, from the characteristic information, and compares the characteristic frequency with the frequency of appearance;
   frequency based authenticating means that decides whether the frequency of appearance is larger than the characteristic frequency based on a result of comparing; and
   frequency based control means that switches the computer in a locked operating state in which the user is prevented from using the computer, if the frequency based authenticating means has decided that the frequency of appearance is larger than the characteristic frequency.

2. An authenticating system, comprising:
   an input supervising unit that supervises input manipulations of a computer while a user is logged in the computer;
   an input information acquiring unit that acquires input information for each of the input manipulation detected by the input supervising unit, the input information including a manipulation object of the input manipulation, a manipulation class indentifying a process executed on the input object, and a manipulation characteristic identifying the manner in which the process is executed;
   a characteristic information storing unit that stores characteristic information including stored manipulation objects, stored manipulation classes identifying processes executed for the stored manipulation objects, stored manipulation characteristics identifying manners of executing the processes, and characteristic frequencies, each characteristic frequency corresponding to one of the stored manipulation objects, with a corresponding manipulation class, and a corresponding stored manipulation characteristic;
   a frequency acquiring unit that sorts the input information into groups of input manipulation having the same manipulation object and the same manipulation class, and acquires a frequency of appearance of a manipulation characteristic in a group based on the sorted input information corresponding to input manipulation of the group;
   a frequency based comparing unit that acquires a characteristic frequency corresponding to the same manipulation characteristic as the manipulation characteristic in the group, from the characteristic information, and compares the characteristic frequency with the frequency of appearance;
   a frequency based authenticating unit that decides whether the frequency of appearance is larger than the characteristic frequency based on a result of comparing; and
   a frequency based control unit that switches the computer in a locked operating state which prevents a user from using the computer, if the frequency based authenticating unit has decided that the frequency of appearance is larger than the characteristic frequency.

3. A method for authenticating permission of a user to use a computer by a processor, comprising:
   causing the processor to supervise input manipulations of a computer while a user is logged in the computer;
   casing the processor to acquire input information for each of the input manipulation detected by the input supervising unit, for each input manipulation, the input information including a manipulation object of the input manipulation, a manipulation class indentifying a process executed on the input object, and a manipulation characteristic identifying the manner in which the process is executed;
   causing the processor to sort the input information into groups of input manipulation having the same manipulation object and the same manipulation class;
   causing the processor to acquire a frequency of appearance of a manipulation characteristic in a group based on the sorted input information corresponding to input manipulation of the group;
   causing the processor to retrieve a characteristic frequency for the manipulation characteristic, the manipulation class of the group, and the manipulation object of the group, from stored characteristic information including stored manipulation objects, stored manipulation classes identifying processes executed for the stored manipulation objects, stored manipulation characteristics identifying manners of executing the processes, and characteristic frequencies, each characteristic frequency corresponding to one of the stored manipulation objects, with a corresponding manipulation class, and a corresponding stored manipulation characteristic;
   causing the processor to compare the frequency of appearance with the retrieved characteristic frequency;
   causing the processor to switch the computer in a lock state in which the user is prevented from using the computer, when the frequency of appearance is larger with respect to the retrieved characteristic frequency.

* * * * *

UNITED STATES PATENT AND TRADEMARK OFFICE
CERTIFICATE OF CORRECTION

| | | |
|---|---|---|
| PATENT NO. | : 7,725,946 B2 | |
| APPLICATION NO. | : 11/406284 | |
| DATED | : May 25, 2010 | |
| INVENTOR(S) | : Nobuo Ogushi | |

It is certified that error appears in the above-identified patent and that said Letters Patent is hereby corrected as shown below:

Column 13, Line 4-5 delete "manipulation" and insert --manipulations--.

Column 13, Line 52 delete "manipulation" and insert --manipulations--.

Column 13, Line 55 delete "indentifying" and insert --identifying--.

Column 14, Line 6 delete "manipulation" and insert --manipulations--.

Column 14, Line 10 delete "manipulation" and insert --manipulations--.

Column 14, Line 30 delete "casing" and insert --causing--.

Column 14, Line 31 delete "manipulation" and insert --manipulations--.

Column 14, Line 34 delete "indentifying" and insert --identifying--.

Column 14, Line 39 delete "manipulation" and insert --manipulations--.

Column 14, Line 44 delete "manipulation" and insert --manipulations--.

Signed and Sealed this
Fourth Day of January, 2011

David J. Kappos
*Director of the United States Patent and Trademark Office*